United States Patent [19]

Hubbard et al.

[11] 4,228,485

[45] Oct. 14, 1980

[54] BLINKER AIMING POST LIGHT

[76] Inventors: Carl A. Hubbard; Colin M. Hudson, both of Hqs. I Corps. (RDK/US) Group, APO, San Francisco, Calif. 96358

[21] Appl. No.: 10,551

[22] Filed: Feb. 9, 1979

[51] Int. Cl.[3] H04M 1/22

[52] U.S. Cl. 362/191; 362/197; 362/205; 362/396; 362/800

[58] Field of Search 362/190, 191, 197, 396, 362/800, 205

[56] References Cited

U.S. PATENT DOCUMENTS 3,867,764 2/1975 Dunmire 362/800 X

*Primary Examiner*—Stephen J. Lechert, Jr.

*Attorney, Agent, or Firm*—Nathan Edelberg; Robert P. Gibson; Robert O. Richardson

[57] ABSTRACT

An aiming post light for artillery and mortar operations at night wherein an ordinary GI flashlight is converted with solid state circuitry to use a blinking light emitting diode (LED) as a light source, enabling ordinary flashlight batteries to last for months of constant use instead of the few hours life in use with previous post lights.

5 Claims, 6 Drawing Figures

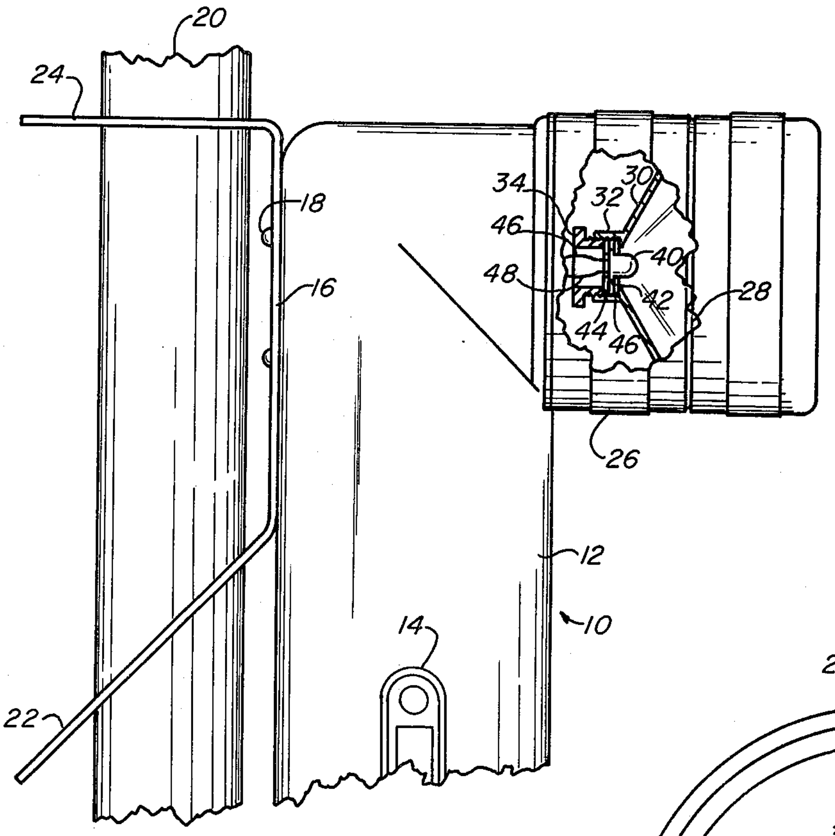
Fig_1_
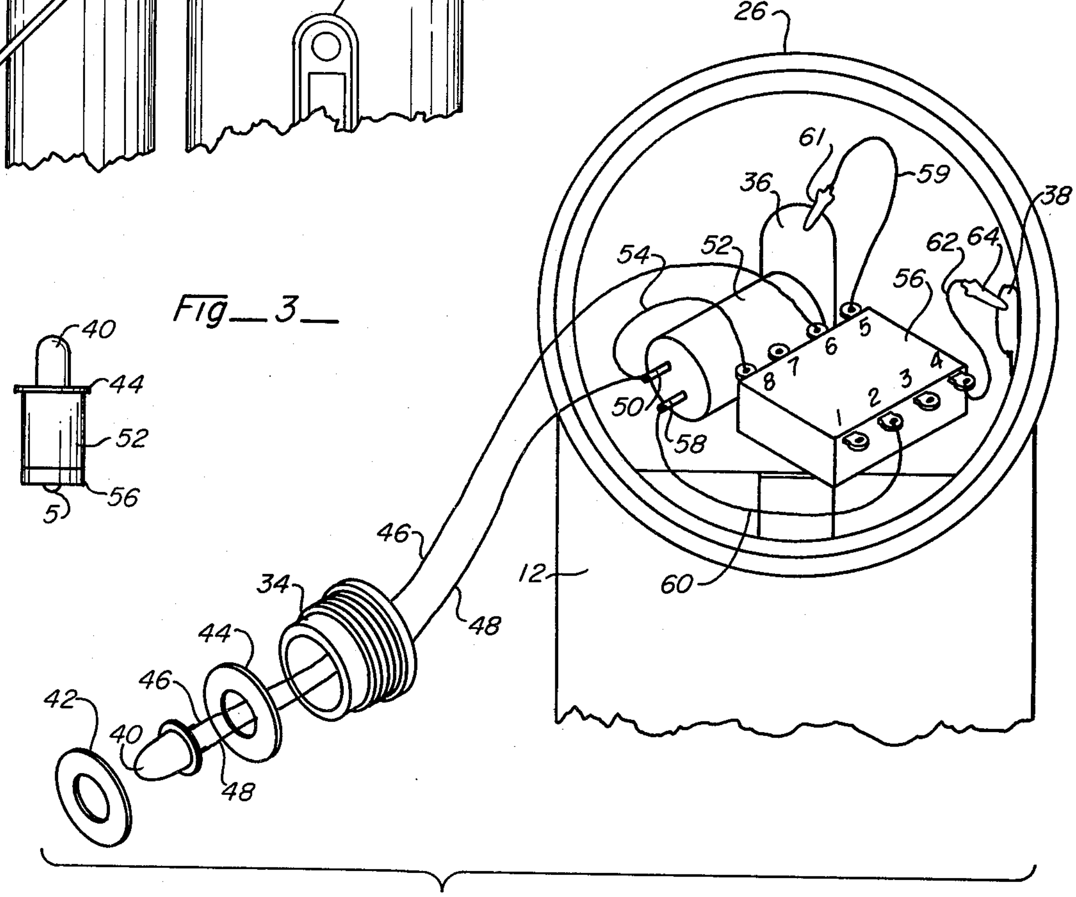
Fig_3_
Fig_2_

BLINKER AIMING POST LIGHT

GOVERNMENT RIGHTS

The invention described herein may be manufactured and/or used by or for the Government for governmental purposes without the payment of any royalty thereon.

BACKGROUND OF THE INVENTION

Since WWII the MI4 Aiming Post Light has been used for artillery and mortar operations to maintain orientation despite possible movement of the gun when fired. Each light consisted of two size D flashlight batteries in a brass case having an on-off switch, an incandescent bulb and a reflector/lens filter. To avoid confusion, half the lights have a red filter and half have a green filter. Each howitzer or mortar uses one of each. They presently cost over $25 each.

Aiming post lights are placed forward of their guns a distance from 50 to 100 meters. They drain the batteries in a night or so and require replacement, sometimes a hazardous task, particularly when the enemy is close by. Obviously an aiming light that will survive an engagement without replacing batteries is preferred.

SUMMARY OF THE PRESENT INVENTION

In accordance with the present invention, an aiming post light has been developed that has a very prolonged use life compared to those heretofore used. Advantage is taken of solid state circuitry, including solid state light sources, which will provide an appropriate light intensity and switching frequency to obtain most efficient use of dry cell energy while obtaining optimum human perception of the light.

In a preferred embodiment, a GI flashlight is fitted with a stake engaging clamp. The head of the flashlight has a pair of contacts which contact the bottom of the regular flashlight bulb and the side of the reflector into which the bulb is positioned. These contacts place the bulb into the circuit with the batteries and on-off switch for its operation. In the present invention, the solid state circuit, including the light emitting diode, is connected between these two flashlight contacts with light emitting diode positioned in the reflector to replace the original flashlight bulb. The regular flashlight on-off switch is thus in circuit and is used to initiate the blinking action of the diode. The diodes may emit red or green light and the blinking frequencies of each color may vary to assist color blind operators to distinguish between the two colors.

Not only does the blinker aiming post light of the present invention achieve its major goal of extremely long use life, in the order of months instead of hours, but it is also far less expensive than those heretofore used. For example, the flashlight costs under $2 and the circuit package less than $1. Flashlight and batteries are already fielded items, plentiful in supply and easy to obtain. Only the mounting bracket and circuit package need be added.

BRIEF DESCRIPTION OF DRAWINGS

FIG. 1 is an elevational view of the aiming light attached to a mounting stake,

FIG. 2 is an exploded perspective view showing how the circuitry is packaged,

FIG. 3 is a side elevational view showing the circuit package retained by the flashlight bulb holder.

DETAILED DESCRIPTION OF ILLUSTRATIVE EMBODIMENTS

Figure 4:
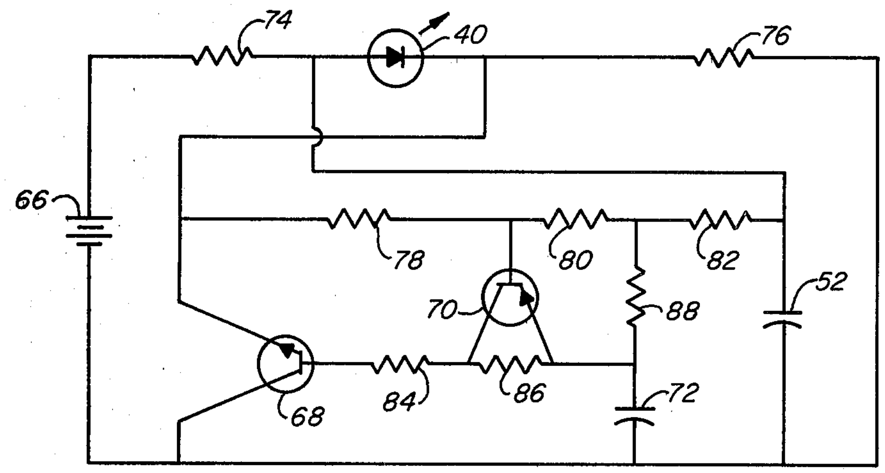
FIG. 4 is a schematic diagram of one circuit for actuating the blinking light.

Referring now to FIG. 1, there is shown a flashlight 10 consisting of a housing 12 with an on-off switch 14 thereon. The housing 12 has a friction bracket 16 attached thereto such as by means of rivets 18. This bracket has a pair of apertures through which a stake 20 may be passed. This bracket preferably is of a spring-like material whereby its ends 22, 24 may be flexed toward each other as the stake 20 is passed therethrough and released to provide a friction grip on the stake.

Flashlight 10 is of the GI or Boy Scout variety which projects a light beam at right angles to the axis of the housing 12. Threadedly engaging the housing 12 is a lens-reflector mounting ring 26 which contains a lens 28 and conical reflector 30. At the apex 32 of reflector 30 is a threaded aperture into which a bulb holder 34 is screwed to retain an ordinary flashlight bulb, not shown, in position. Within the housing are a pair of bulb engaging contacts, shown as 36, 38 in FIG. 2. When used as a regular flashlight, central contact 36 engages the end of the ordinary bulb and side contact 38 engages the back surface of reflector 30 which in turn contacts the side surface of the bulb base. The circuit is completed by switch 14 to light an ordinary flashlight bulb.

In the present invention the ordinary bulb is replaced by a light emitting diode (LED) 40 sandwiched between the bulb holder 34 and apex of reflector 30, assisted by a pair of washers 42, 44 on both sides of base flange 46. This diode has a pair of contact posts to which a pair of leads 46, 48 are connected. As shown in FIG. 2, one of these leads 48 is connected to the negative terminal 50 of capacitor 52 and also through lead 54 to terminal 8 of integrated circuit chip 56. This chip is commercially available and is known as RS3909. It may be procured, for example, from Radio Shack, a division of Tandy Corporation. National Semiconductor Corporation calls theirs LM3909. The circuitry therein will be shown in FIG. 6 and explained hereinafter in greater detail. The other lead 46 from diode 40 is connected to terminal 6 of chip 56. The positive terminal 58 of capacitor 52 is connected to terminal 2 of chip 56 through lead 60. Terminal 5 is connected to the flashlight bulb engaging contact 36 by means of lead 59 and alligator clip 61. Terminal 4 of chip 56 is connected to the flashlight reflector contact 38 by means of lead 62 and alligator clip 64.

FIG. 3 is a side elevational view of the foregoing circuit package resembling the outer configuration of an ordinary flashlight bulb in order that it may be retained by the flashlight bulb holder when inserted into the reflector, as shown in FIG. 1. Here is shown the LED 40 on a positioning disc 44 which fits over the end of the holder 34 (shown in FIG. 1 and FIG. 2). Capacitor 52 forms the base with the integrated circuit chip 56 on the bottom. Terminal 5 of the chip is placed in the center so that it will contact the flashlight bulb engaging contact 36, shown in FIG. 2. The outside of capacitor 52 is adapted to contact the reflector contact 38, shown in FIG. 2, to replace lead 62 which engages terminal 4 of chip 56. The connection between terminal 4 and the capacitor outer surface is not shown in FIG. 3.

FIG. 4 is a schematic diagram of one circuit for actuating the blinking light. In addition to the LED 40, capacitor 52 and 3 volt battery 66, the circuit includes a PNP transistor 68, NPN transistor 70, capacitor 72 and 8 resistors 74, 76, 78, 80, 82, 84, 86, and 88. Connections are as shown in the drawing and values or characteristics are as follows;

| | |
|---|---|
| Capacitor 52 | 6 volts 330 microfarads |
| Capacitor 72 | 6 volts 22 microfarads |
| Resistor 74 | 10 ohms |
| Resistor 76 | 39K ohms |
| Resistor 78 | 1K ohms |
| Resistor 80 | 1K ohms |
| Resistor 82 | 1K ohms |
| Resistor 84 | 1K ohms |
| Resistor 86 | 470K ohms |
| Resistor 88 | 2,2K ohms |
| PNP 66 | MPS 3569 |
| NPN 70 | 2N4403 |

Figure 5:
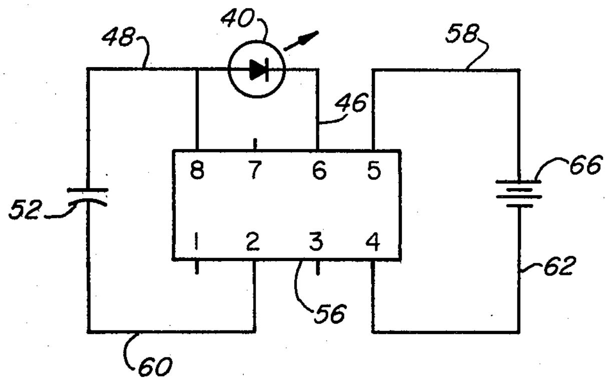
FIG. 5 is a schematic diagram of another circuit with a commercially available chip shown in block form.

In FIG. 5 is shown a circuit that reduces the size and expense of the circuit in FIG. 4. Here an RS 3909 integrated circuit chip 56 is used. It has 8 terminals to which leads to other components may be attached. Terminals 1, 3, and 7 are unattached. Terminal 2 connects to the positive side of capacitor 52 which is rated 6 volts 5–200 microfarads. The negative side and terminal 8 are connected to the cathode of LED 40 and terminal 6 connects to its anode. Terminals 4 and 5 are connected to a 3 volt source; i.e., two flashlight batteries connected in series. The flashing frequency of LED 40 may be adjusted by varying the size of capacitor 52.

Figure 6:
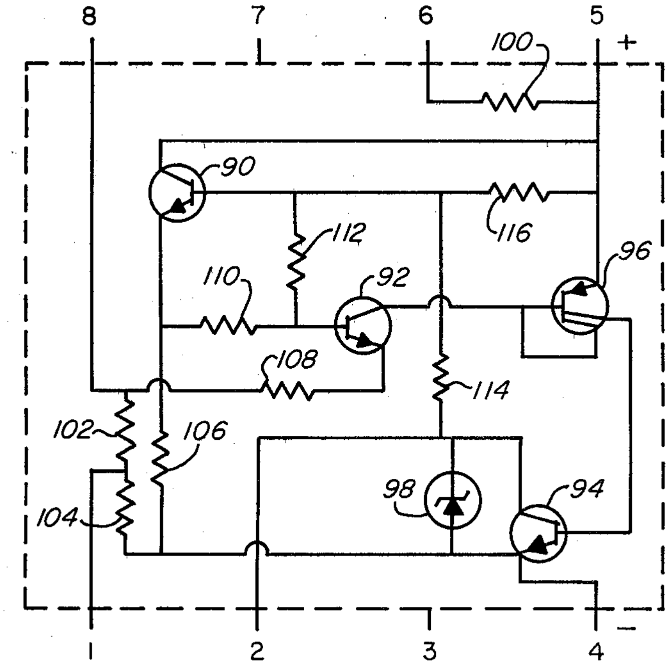
FIG. 6 is a schematic diagram of the chip shown in FIG. 5.

A schematic diagram of the integrated circuit 56 is shown in FIG. 6. It includes three NPN transistors 90, 92, 94, a PNIP transistor 96 and a unidirectional diode 98 with a 6.5 volt rating, all connected as shown with resistors 100, 102, 104, 106, 108, 110, 112, 114, and 116, having the following values:

| | |
|---|---|
| Resistor 100 | 12 ohms |
| Resistor 102 | 6K ohms |
| Resistor 104 | 3K ohms |
| Resistor 106 | 20K ohms |
| Resistor 108 | 100 ohms |
| Resistor 110 | 10K ohms |
| Resistor 112 | 20K ohms |

-continued

| | |
|---|---|
| Resistor 114 | 400 ohms |
| Resistor 116 | 400 ohms |

The invention in its broader aspects is not limited to the specific combinations, improvements and instrumentalities described but departures may be made therefrom within the scope of the accompanying claims without departing from the principles of the invention and without sacrificing its chief advantages.

We claim:

1. A blinker aiming post light comprising:
a stake,
a flashlight having a stake engaging clamp,
said flashlight being attached to said stake,
a DC voltage source,
a flasher integrated circuit including a light emitting diode, and switch means for connecting said circuit to said voltage source,
said DC voltage source comprising flashlight batteries in a flashlight,
said switch means comprises a flashlight switch,
said diode replacing the conventional flashlight bulb,
said integrated circuit connecting with the battery contacts in said flashlight.

2. A blinker aiming post light as in claim 1 wherein said integrated circuit includes a capacitor in circuit with said diode,
said flashlight having a reflector,
an electrical battery contact in said flashlight engaging said reflector,
a bulb holder engageable with said reflector,
said capacitor, circuit, and diode being retained by said reflector and said bulb holder, and
an electrical battery contact in said flashlight between a terminal on said circuit and said batteries.

3. A blinker aiming post light as in claim 2 wherein said capacitor, circuit and diode are made integral and are held in position by said bulb holder.

4. A blinker aiming post light as in claim 3 wherein said capacitor forms a base with said circuit attached to the bottom thereof and said diode is attached to the top thereof, said capacitor and circuit being of the size and shape approximating the base of an ordinary flashlight bulb.

5. A blinker aiming post light as in claim 4 wherein said terminal of said circuit engages said battery contact in said flashlight when positioned by said bulb holder and said light is operated.

* * * * *

UNITED STATES PATENT AND TRADEMARK OFFICE
CERTIFICATE OF CORRECTION

PATENT NO. : 4228485

DATED : October 14, 1980

INVENTOR(S) : Carl A. Hubbard & Colin M. Hudson

It is certified that error appears in the above-identified patent and that said Letters Patent are hereby corrected as shown below:

On the front page, the inventors addresses, delete "Carl A. Hubbard; Colin M. Hudson, both of Hqs. I Corps. (RDK/US) Group, APO San Francisco, Calif. 96358" and insert -- Carl A. Hubbard, 2775 Maroon Bells Ave., Colorado Springs, Colorado 80918; Colin M. Hudson, 3459 49th Street, Moline, Illinois 61265 --

Signed and Sealed this

*Tenth* Day of *February 1981*

[SEAL]

*Attest:*

RENE D. TEGTMEYER

*Attesting Officer* *Acting Commissioner of Patents and Trademarks*